US006248993B1

(12) United States Patent
Bunselmeier et al.

(10) Patent No.: US 6,248,993 B1
(45) Date of Patent: Jun. 19, 2001

(54) STEERING ANGLE SENSOR

(75) Inventors: Dirk Bunselmeier, Ludenscheid; Kersten Rimke, Herscheid; Klaus Hinteresch, Schwerte; Frank Blasing, Werl, all of (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/343,869

(22) Filed: Jun. 30, 1999

(30) Foreign Application Priority Data

Aug. 5, 1998 (DE) .............................................. 198 35 290

(51) Int. Cl.[7] ................................................. G01D 5/347
(52) U.S. Cl. ................................. 250/231.13; 250/231.16
(58) Field of Search ...................... 250/231.13, 231.101, 250/231.15, 231.16, 231.17, 231.18, 237 G; 341/13, 14; 116/31; 701/41, 42, 43

(56) References Cited

U.S. PATENT DOCUMENTS

| 4,614,869 | * | 9/1986 | Hoshino et al. | 250/231.14 |
| 4,683,375 | * | 7/1987 | Hoshino et al. | 250/231.14 |
| 5,004,915 | * | 4/1991 | Umehara et al. | 250/231.14 |
| 5,220,162 | * | 6/1993 | Umehara | 250/231.13 |
| 5,243,188 | * | 9/1993 | Hattori et al. | 250/231.17 |
| 5,734,160 | * | 3/1998 | Chung et al. | 250/231.13 |
| 5,818,038 | * | 10/1998 | Kerkmann et al. | 250/231.13 |
| 5,949,067 | * | 9/1999 | Sano | 250/231.13 |

FOREIGN PATENT DOCUMENTS 40 22 837    1/1992   (DE) .

\* cited by examiner

*Primary Examiner*—John R. Lee
(74) *Attorney, Agent, or Firm*—Brooks & Kushman P.C.

(57) ABSTRACT

A steering angle sensor for determining the absolute angle position of a steering wheel of a motor vehicle includes a first sensor unit (4, 12). The first sensor unit (4,12) detects the steering angle position within an angle segment of the entire rotational range of the steering wheel. The first sensor unit (4,12) has a rotor (12) coupled to the rotational movement of the steering wheel. The steering angle sensor further includes a second sensor unit (3,11) for detecting the steering angle position within an angle segment of the entire rotational range of the steering wheel. The second sensor unit (3,11) includes a rotor (11) coupled in a geared manner to the rotational movement of rotor (12) such that the rotors (11,12) have slightly different rotational speeds while the steering wheel is moving. The steering angle position is determined from a measurement value detected by the first sensor unit (3,11) and a measurement value detected by the second sensor unit (4,12). Each pair of values serves to define an absolute steering angle position over the entire rotational range of the steering wheel.

8 Claims, 2 Drawing Sheets

STEERING ANGLE SENSOR

TECHNICAL FIELD

The present invention generally relates to detecting the angle position of a steering wheel of a motor vehicle. More particularly, the present invention relates to a steering angle sensor for determining the absolute angle position of a steering wheel. In greater particularity, the present invention is a steering angle sensor having a sensor unit for detecting the steering angle position of a steering wheel within an angle segment of the entire rotational range of the steering wheel in which the rotor of this sensor unit is coupled to the rotational movement of the steering wheel.

BACKGROUND ART

The steering angle and steering angle lock in motor vehicles are required for influencing a driving dynamics control system. In addition to the steering angle values, this driving dynamics control system obtains further measurement data, such as wheel rotational speed and the rotation of the motor vehicle about its vertical axis. The driving dynamics control system evaluates the absolute steering angle lock and the steering speed values with the other detected data. The driving dynamics control system uses these values and other data for controlling actuators such as brakes and engine management.

DE 4022837 A1 discloses an optoelectronic steering angle sensor. The steering angle sensor includes a light source and a line sensor arranged in parallel and spaced apart from each other. An encoder disc is disposed between the light source and the line sensor. The encoder disc is non-rotatable connected to the steering spindle. The line sensor is a CCD-sensor line. The code transmitter is formed as a light slit disc and as a code trace in the form of a spiral which increases in size from the inside outwards. The exposure of the image points of the line sensor in a specific steering lock makes it possible to obtain information regarding the actual steering angle lock.

An Archimedean spiral extending over 360° provides the coding for this encoder disc. This steering angle sensor determines absolute steering wheel angle positions only in the range of the coding and thus only in the range of 360°. However, it is possible to rotate steering wheels much more than 360°. On the basis of a straight position of the wheels and thus a zero position of the steering angle sensor it is desirable to detect the absolute steering angle in an angular range of the entire rotational range of the steering wheel.

The steering angle sensor disclosed in DE 4022837 A1 only detects an angle segment in the range of a complete steering wheel lock of 180° to the right and 180° to the left starting from the zero position of the steering angle sensor. However, steering wheels in motor vehicles can make, for example, three complete turns to the right and to the left starting from the zero position. Thus, a steering angle sensor which measures in the absolute steering angle position would have to be able to cover 2160°, i.e., six revolutions.

Steering angle sensor systems are disposed in the region of the steering spindle of the motor vehicle. The installation space available in this region for installing the steering angle sensor is limited both in the axial direction and, in particular, in the radial direction with respect to the steering spindle. For this reason, an attempt is made to connect steering angle sensor systems to existing modules such as the flat spiral spring cartridge or to integrate them therein. In many cases, this is only possible if the steering angle sensor requires the smallest possible allowable installation space.

DISCLOSURE OF INVENTION

Accordingly, it is an object of the present invention to provide a steering angle sensor for determining the absolute angle position of a steering wheel of a motor vehicle within the entire rotational range of the steering wheel.

In carrying out the above object and other objects, the present invention provides a steering angle sensor for determining absolute angle position of a steering wheel in a motor vehicle within the rotational range of the steering wheel. The steering angle sensor includes a first sensor unit for detecting steering angle position of the steering wheel within a first angle segment of the rotational range of the steering wheel. The first sensor unit has a driving rotor coupled to the rotational movement of the steering wheel. The steering angle sensor further includes a second sensor unit for detecting steering angle position of the steering wheel within a second angle segment of the rotational range of the steering wheel. The second sensor unit has a driven rotor coupled to the driving rotor such that during rotational movement of the steering wheel the driven rotor and the driving rotor rotate at different speeds. The absolute angle position of the steering wheel is determined from the steering angle position detected by the first sensor unit and the steering angle position detected by the second sensor unit.

In contrast to prior art steering angle sensors, the steering angle sensor of the present invention includes two sensor units. Each sensor unit has a rotor. The rotors are coupled together with gears such that during a steering wheel movement the rotors move at slightly different rotational speeds. The rotor of one sensor unit is coupled to the rotational movement of the steering spindle. This rotor is the driving rotor. The driving rotor drives the rotor of the other sensor unit. The other rotor is the driven rotor. Both sensor units detect angle position of the steering wheel within respective predetermined angle segments of the entire rotational range of the steering wheel. It is expedient if the predetermined angle segments monitored by the two sensor units are different, for example, if they differ from each other by 5° to 15°.

The absolute angle position of the steering wheel of a motor vehicle is defined over the entire rotational range of the steering wheel by a first measurement value, i.e., steering angle position within a first predetermined angle segment, detected by the first sensor unit and a second measurement value, i.e., steering angle position within a second predetermined angle segment, detected by the second sensor unit. If the sensor units detect the angle position with different degrees of accuracy the steering angle sensor functions according to a type of nonius sensor.

The advantages accruing to the present invention are numerous. For example, two sensor units each monitor only one predetermined angle segment of the entire rotational range of the steering wheel while the rotor of one sensor unit is disposed within the rotor of the other sensor unit. This arrangement is particularly space-saving, so that the installation space required for steering angle sensor in comparison to the prior art steering angle sensors, which use only one single sensor unit, is only slightly increased in size or not increased in size at all.

Preferably, the outer rotor is coupled to the movement of the steering spindle and the inner rotor is driven by a planetary gear. Advantageously, in accordance with an alternate embodiment of the present invention, the rotors are geared coupled together wherein the geared coupling is produced by rotational axes of the two rotors being disposed in parallel with each other in an offset position. In this alternate embodiment, the inner rotor has external, circumferential toothing which engage into internal toothing of the outer rotor. Expediently, the diameters of the rotors of the two sensor units are only slightly different and, therefore, the speed difference between the two rotors is small. Consequently, this substantially obviates noise resulting from considerably different rotational speeds in the case of a different geared coupling of the two rotors.

The inner rotor is preferably held in the outer rotor by an eccentric bearing ring. The bearing ring has fixing means which non-rotatable fix the bearing ring to the stator of the inner rotor. In so doing, it is expedient for the fixing means to be in the form of a hollow spigot equipped with an elongate hole extending in the radial direction. A holding spigot attached on the stator side engages into the elongate hole of the hollow spigot. The use of the bearing ring renders it possible to precisely mount the two rotors disposed with their rotational axes in an eccentric manner with respect to each other, while simultaneously taking into account the radial tolerances.

Preferably, the two sensor units function in an optoelectronic manner like fork couplers with each sensor unit having a transceiver. Each transceiver is provided with individual light sources and photosensitive receivers. A movement gap is between the individual light sources and the receivers. Each rotor has a shutter ring having at least one shutter portion. The shutter portions engage into the respective movement gaps. The angle segment monitored by one rotor is dependent upon how many similar shutter portions are disposed on the shutter ring of the rotor. For example, one rotor can have six shutter portions on its shutter ring and the other rotor can have five shutter portions on its shutter ring. The shutter portions include individual shutter pieces which are separated from each other by openings. The shutter pieces interrupt the light between the light sources and the light receivers as the rotors rotate across the movement gap. From the interruptions, it is possible to determine a measurement value or angle position value depending upon the position of the rotor in its angle segment.

It is particularly advantageous that it is not necessary to initialize the steering angle sensor to a starting value. Consequently, the steering angle sensor does not need to be initialized after disconnecting the battery and after manually adjusting the wheel angle position.

It is expedient if the transceivers of the two rotors are disposed adjacent to each other in the radial direction with respect to the steering spindle in which the inner transceiver is provided for the inner rotor and the outer transceiver is provided for the outer rotor.

The above objects and other objects, features, and advantages of the present invention are readily apparent from the following detailed description of the best mode for carrying out the present invention when taken in connection with the accompanying drawings.

BEST MODE FOR CARRYING OUT THE INVENTION

Figure 1:
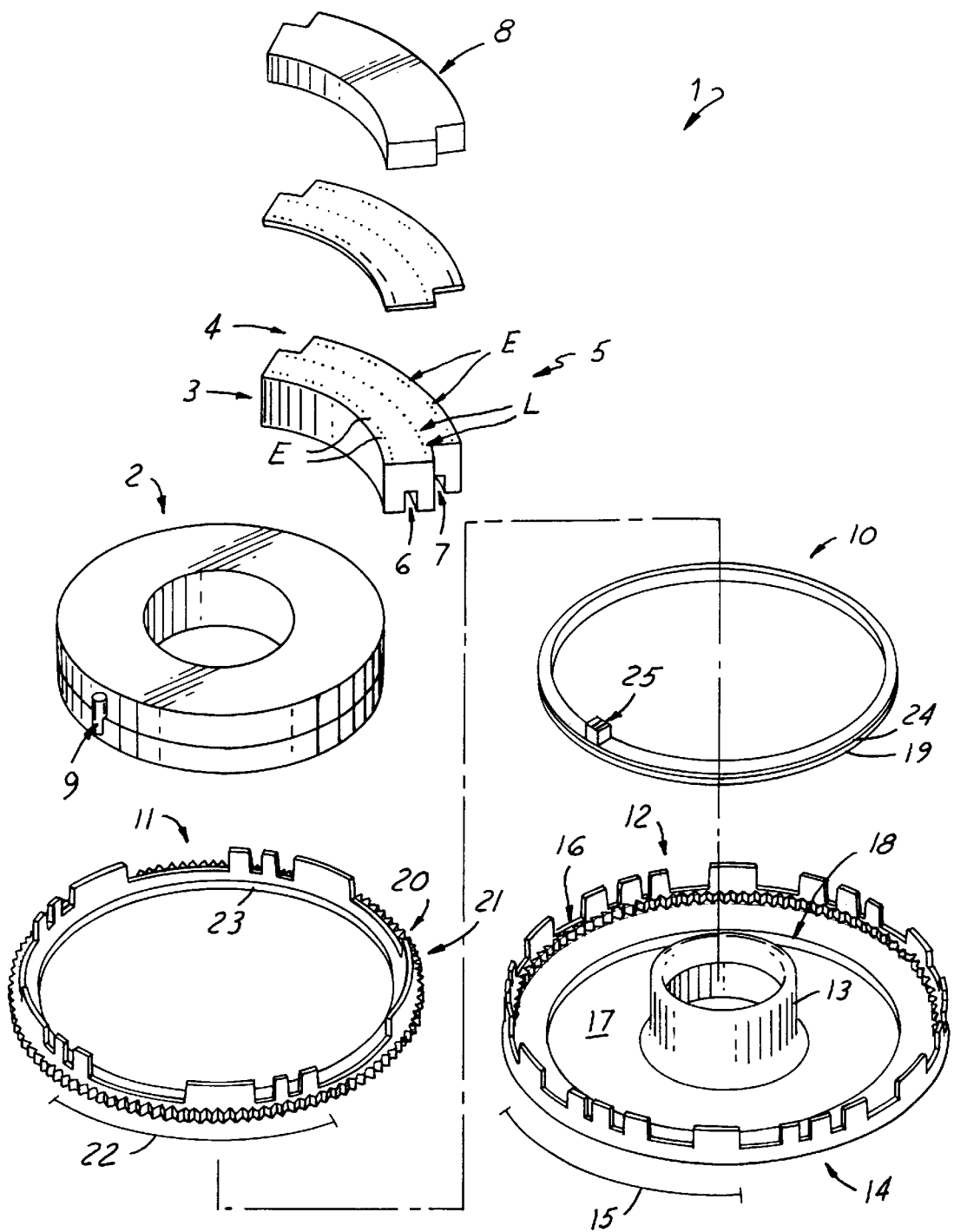
FIG. 1 illustrates an exploded view of a steering angle sensor for determining absolute angle position of the steering wheel of a motor vehicle in the entire rotational range of the steering wheel in accordance with the present invention.

Referring now to FIG. 1, a steering angle sensor 1 for detecting the absolute angle position of a steering wheel of a motor vehicle in accordance with the present invention is shown. Steering angle sensor 1 includes a stator 2 fixed in relation to the rotational movement of the steering spindle of the motor vehicle. Stator 2 has two transceivers 3, 4. Transceivers 3, 4 each have a predetermined number of light sources L and photosensitive receivers E. The photosensitive surfaces of the receivers E are point towards a light source L. Transceivers 3, 4 are combined in one transceiver module 5. The light sources L are disposed in a row between the two opposite receivers E. The light sources L emit rays alternately to the receivers of each transceiver 3, 4. A movement gap 6, 7 is provided between the light sources L and the respective receivers E of respective transceivers 3, 4. The top of transceiver module 5 is closed by a cover 8. A holding spigot 9 protruding downwards is on the periphery to stator 2 to fix a bearing ring 10.

Transceivers 3, 4 of transceiver module 5 each have a respective rotor 11, 12. Rotors 11, 12 are segment transmitters. Transceiver 3 has segment transmitter 11 and transceiver 4 has segment transmitter 12. Segment transmitters 11, 12 engage each other in a geared manner and are rotatably mounted on bearing ring 10. Segment transmitter 12 is coupled directly to the rotational movement of the steering spindle. The steering spindle engages into an inner coupling piece 13 of segment transmitter 12. Segment transmitter 12 has an upwardly protruding shutter ring 14. Shutter ring 14 includes six similarly integrally formed shutter portions 15. Shutter portions 15 are disposed at the same angle distance from each other. One shutter portion 15 has four individual shutter pieces spaced apart from each other by openings. The length of a shutter portion 15 is indicated in FIG. 1.

On the inner side, shutter ring 14 has internal toothing 16 preferably having 111 individual teeth. In order to hold segment transmitter 12 on bearing ring 10, segment transmitter 12 includes a bearing ring receiving arrangement 17. Holding beads 18 protrude uniformly and peripherally therefrom. Holding beads 18 engage into a lower bearing groove 19 provided in a peripheral manner in bearing ring 10.

Segment transmitter 11 is an annular body which on the outer side has external toothing 20. External toothing cooperate with toothing 16 of segment transmitter 12. Toothing 20 preferably has 108 individual teeth. When the steering spindle is rotated segment transmitter 12 moves at the rotational speed of the steering spindle and segment transmitter 11 moves slightly more quickly.

Segment transmitter 11 has a shutter ring 21. Shutter ring 21 has five individual shutter portions 22 protruding upwards. Each shutter portion 22 has three shutter pieces. The shutter pieces have different widths and are separated from each other by openings. On the inner side, segment transmitter 11 is provided with holding beads 23. Holding beads 23 protrude inwards and are disposed peripherally and uniformly. Holding beads 23 mount segment transmitter 11 on bearing ring 10 and engage into an upper bearing groove 24 of bearing ring 10.

Figure 2:
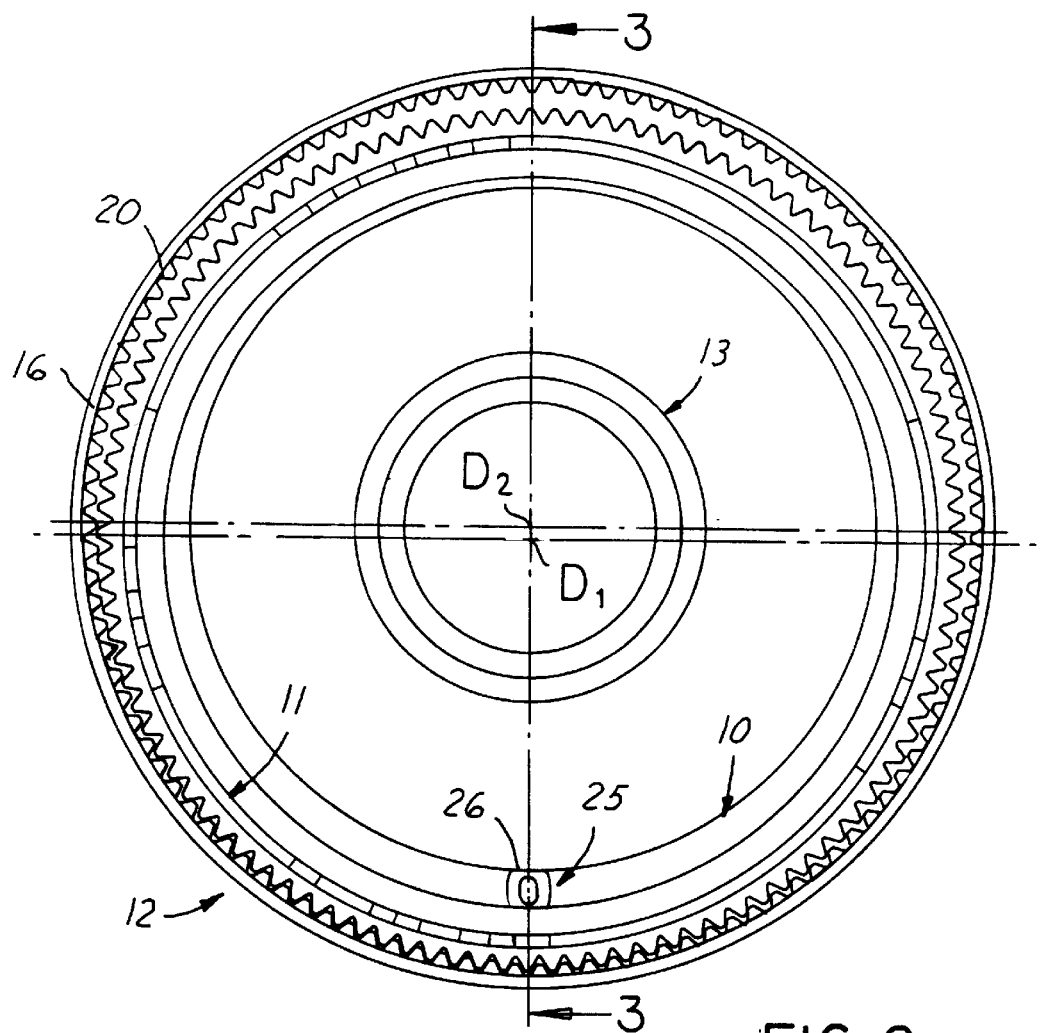
FIG. 2 illustrates a view into the steering angle sensor.

FIG. 2 illustrates the cooperation of segment transmitters 11, 12. Segment transmitter 12 drives segment transmitter 11 as the steering wheel rotates. The rotational axis $D_1$, of inner segment transmitter 11 is disposed offset with respect to the rotational axis $D_2$ of outer segment transmitter 12. This eccentricity ensures that regions of external toothing 20 of segment transmitter 11 engage with internal toothing 16 of external segment transmitter 12. This produces the geared coupling of segment transmitters 11, 12.

To take into consideration this eccentricity, bearing ring 10 is also eccentric. A hollow spigot 25 is disposed protruding from the upper end face of bearing ring 10 and holding spigot 9 of stator 2 engages into elongate hole 26 of the hollow spigot for non-rotatable fixing bearing ring 10. The provision of elongate hole 26 enables tolerances of segment transmitters 11, 12 to be equalized in the radial direction. The coupling piece is disposed centrally with respect to the rotational axis $D_2$ of outer segment transmitter 12 for connecting segment transmitter 12 to the steering spindle.

Figure 3:
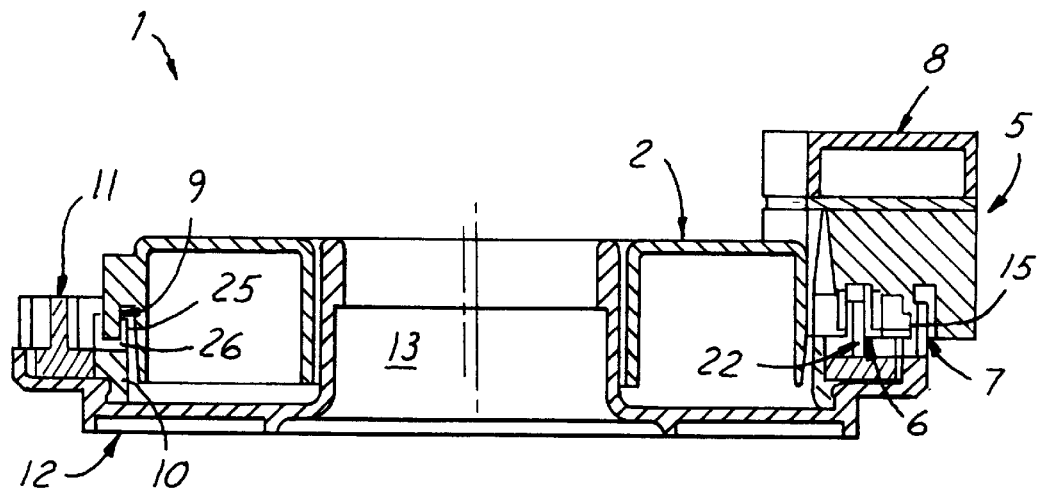
FIG. 3 illustrates a sectional view along the line 3—3 of FIG. 2 through the assembled steering angle sensor.

A cross-section of the assembled steering angle sensor 1 is illustrated in FIG. 3. Shutter portions 22 of segment transmitter 11 and shutter portions 15 of segment transmitter 12 engage into respective movement gaps 6, 7 of transceiver module 5. FIG. 3 also illustrates the arrangement of bearing ring 10 and the mounting of segment transmitters 11, 12 on bearing ring 10. Holding spigot 9 of stator 2 engages into hollow spigot 25 of bearing ring 10, so that bearing ring 10 is non-rotatable attached to stator 2.

Thus it is apparent that there has been provided, in accordance with the present invention, a steering angle sensor that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A steering angle sensor for determining the absolute angle position of a steering wheel, wherein the steering wheel has a rotational range, the steering angle sensor comprising:

a stator fixed in relation to the rotational movement of the steering wheel;

a first sensor unit for detecting steering wheel angle position within a first angle segment of the rotational range of the steering wheel, the first sensor unit having a driving rotor coupled to the rotational movement of the steering wheel, the first sensor unit further having a first light transceiver fixed to the stator, the first light transceiver operable with the driving rotor for detecting angle position of the driving rotor in order to detect the steering wheel angle position within the first angle segment of the rotational range of the steering wheel; and a second sensor unit for detecting steering wheel angle position within a different second angle segment of the rotational range of the steering wheel, the second sensor unit having a driven rotor disposed within the driving rotor such that the driving rotor and the driven rotor lie together in a plane around the stator, the driven rotor being coupled to the driving rotor such that during rotational movement of the steering wheel the driven rotor and the driving rotor rotate at different speeds, the second sensor unit further having a second light transceiver fixed to the stator, the second light transceiver operable with the driven rotor for detecting angle position of the driven rotor in order to detect the steering wheel angle position within the second angle segment of the rotational range of the steering wheel, wherein the absolute angle position of the steering wheel is determined from the steering wheel angle positions detected by the first and second sensor units.

2. The steering angle sensor of claim 1 wherein:

the driven rotor and the driving rotor have respective rotational axes ($D_1$, $D_2$), the driven rotor and the driving rotor are disposed in parallel with each other in an offset position and the inner driven rotor has external toothing which engage into internal toothing of the outer driving rotor.

3. The steering angle sensor of claim 2 wherein:

an eccentric bearing ring is non-rotatably fixed to the stator.

4. The steering angle sensor of claim 3 wherein:

fixing means fix the eccentric bearing ring to the stator, the fixing means having a hollow spigot equipped with an elongate hole extending in a radial direction, and a holding spigot engaging into the elongate hole of the hollow spigot.

5. The steering angle sensor of claim 1 wherein:

the first and second light transceivers each have individual light sources and light receivers, each of the first and second light transceivers further having a movement gap provided between the light sources and the light receivers, each of the first and second light transceivers further having a shutter ring disposed on the respective rotor, each shutter ring having at least one shutter portion which engage into the movement gap.

6. The steering angle sensor of claim 5 wherein:

the angle segment detected by each of the first and second sensor units is defined by the number of shutter portions disposed on the shutter rings.

7. The steering angle sensor of claim 6 wherein:

the shutter ring of the driving rotor has six shutter portions and the shutter ring of the driven rotor has five shutter portions.

8. The steering angle sensor of claim 5 wherein:

the first and second light transceivers are disposed lying adjacent to each other in a radial direction.

* * * * *